US010161107B2

(12) United States Patent
Namai

(10) Patent No.: US 10,161,107 B2
(45) Date of Patent: Dec. 25, 2018

(54) CONSTRUCTION MACHINE

(71) Applicant: Hitachi Construction Machinery Co., Ltd., Taito-ku, Tokyo (JP)

(72) Inventor: Yoshio Namai, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/554,871

(22) PCT Filed: Mar. 7, 2016

(86) PCT No.: PCT/JP2016/056977
§ 371 (c)(1),
(2) Date: Aug. 31, 2017

(87) PCT Pub. No.: WO2016/167045
PCT Pub. Date: Oct. 20, 2016

(65) Prior Publication Data
US 2018/0044886 A1    Feb. 15, 2018

(30) Foreign Application Priority Data

Apr. 17, 2015    (JP) .................................. 2015-084995

(51) Int. Cl.
*E02F 9/00*    (2006.01)
*E02F 9/08*    (2006.01)
*E02F 3/34*    (2006.01)

(52) U.S. Cl.
CPC .............. *E02F 9/0883* (2013.01); *E02F 9/00* (2013.01); *E02F 3/34* (2013.01)

(58) Field of Classification Search
CPC ... E02F 9/00; E02F 9/0883; E02F 3/34; E02F 3/283; E02F 3/30; E02F 3/32; E02F 3/325; E02F 3/369; B60K 15/00
See application file for complete search history.

(56) References Cited

U.S. PATENT DOCUMENTS 7,780,213 B2 *    8/2010    Kim .......................... E02F 9/00
                                                        296/37.6
8,708,087 B2 *    4/2014    Kashu .................... B60K 13/04
                                                        180/291
(Continued)

FOREIGN PATENT DOCUMENTS

JP    2014-47551 A    3/2014
JP    2014-201902 A   10/2014
(Continued)

OTHER PUBLICATIONS

International Search Report (PCT/ISA/210) issued in PCT Application No. PCT/JP2016/056977 dated May 17, 2016 with English-language translation (five (5) pages).
(Continued)

*Primary Examiner* — James A Shriver, II
*Assistant Examiner* — Steve Clemmons
(74) *Attorney, Agent, or Firm* — Crowell & Moring LLP

(57) ABSTRACT

A housing case (16) is provided on a revolving frame (5) at a position on a front side from a fuel tank (12). The housing case (16) is constituted by including a case-fixing bracket (17) having a left leg part (18), a right leg part (19), and amounting platform (20) across a reducing agent tank (14), a lower accommodating case (21) arranged by surrounding the case-fixing bracket (17), and an upper accommodating case (23) located on an upper side of the lower accommodating case (21). Atop surface part (21E) of the lower accommodating case (21) and a lower surface (23B) of the upper accommodating case (23) are connected to the mounting platform (20) of the case-fixing bracket (17). As a result, the lower accommodating case (21) and the upper accommodating case (23) can be firmly mounted on the revolving frame (5) through the case-fixing bracket (17).

4 Claims, 13 Drawing Sheets

(56) References Cited

U.S. PATENT DOCUMENTS

| | | | |
|---|---|---|---|
| 9,027,697 B2* | 5/2015 | Kobayashi | E02F 9/0875 |
| | | | 180/296 |
| 9,290,906 B2* | 3/2016 | Kobayashi | E02F 9/0866 |
| 2013/0276922 A1* | 10/2013 | Kobayashi | F01N 3/2066 |
| | | | 137/565.01 |
| 2014/0291047 A1 | 10/2014 | Matsumoto et al. | |
| 2015/0016932 A1 | 1/2015 | Azuma et al. | |
| 2016/0222629 A1 | 8/2016 | Tsuda et al. | |
| 2017/0335544 A1* | 11/2017 | Imano | B60K 13/04 |

FOREIGN PATENT DOCUMENTS

| | | |
|---|---|---|
| WO | WO 2013/137169 A1 | 9/2013 |
| WO | WO 2015/053273 A1 | 4/2015 |

OTHER PUBLICATIONS

Japanese-language Written Opinion (PCT/ISA/237) issued in PCT Application No. PCT/JP2016/056977 dated May 17, 2016 (three (3) pages).

* cited by examiner

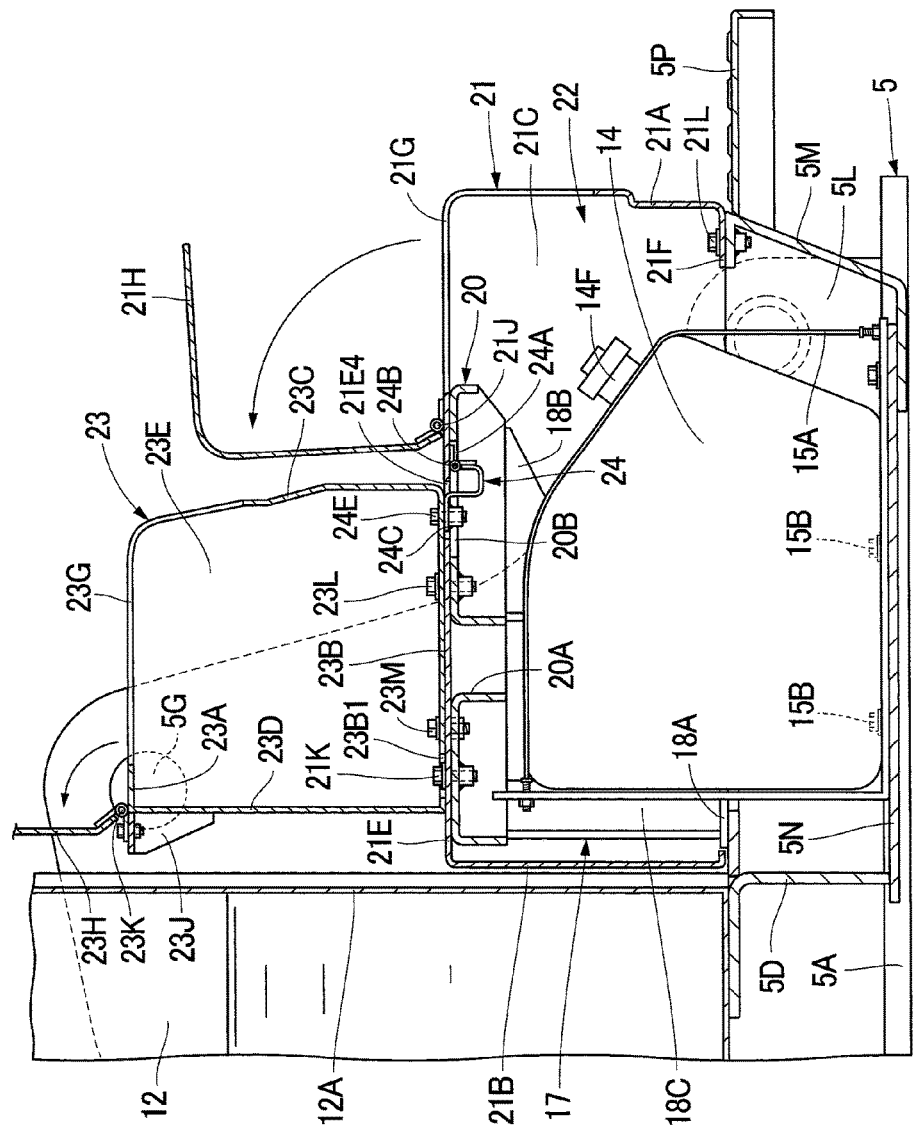

CONSTRUCTION MACHINE

TECHNICAL FIELD

The present invention relates to a construction machine such as a hydraulic excavator on which a reducing agent tank storing a liquid reducing agent such as a urea water is mounted, for example.

BACKGROUND ART

A hydraulic excavator as a typical example of the construction machine is generally constituted by an automotive lower traveling structure, an upper revolving structure rotatably mounted on the lower traveling structure, and a working mechanism tiltably provided on a front part of the upper revolving structure.

The upper revolving structure includes a revolving frame forming a support structural member, an engine mounted on a rear side of the revolving frame, and a cab provided on a front left side of the revolving frame which is a left side of the working mechanism. An operator's seat on which an operator is seated and the like are provided in the cab.

A connecting pin for mounting the working mechanism is provided on front sides of left and right vertical plates constituting the revolving frame. An oil reservoir tank such as a hydraulic oil tank storing hydraulic oil is provided on an outer side of the revolving frame in a left-right direction on a side opposite to the cab by sandwiching the working mechanism, a fuel tank storing fuel. This oil reservoir tank is arranged so that its front end is located on a rear side from the connecting pin of the revolving frame.

On the other hand, a diesel engine is used for an engine of the hydraulic excavator. This diesel engine emits a large amount of nitrogen oxides (hereinafter referred to as NOx). Thus, as a post-processing device of an exhaust gas of the diesel engine, there is a NOx purifying device for purifying NOx. This NOx purifying device is constituted by a urea selective reduction catalyst provided in an exhaust pipe of the engine and removing NOx in the exhaust gas, a reducing agent tank storing a urea water solution as the reducing agent, a urea injection valve injecting the urea water solution in the reducing agent tank to an upstream side of the urea selective reduction catalyst, and a connecting pipeline for connecting the reducing agent tank and the urea injection valve, for example.

Here, when the reducing agent tank is to be provided in the hydraulic excavator, it is desirable that a capacity is set large in order to reduce the number of times of supplying the reducing agent. However, since many devices are mounted on the hydraulic excavator, it is difficult to ensure a space where a large reducing agent tank is newly installed. Thus, a hydraulic excavator constituted such that two accommodating cases are arranged by being stacked vertically on a front side of the oil reservoir tank, and a reducing agent tank is accommodated in a lower accommodating case having a large capacity, while an article is accommodated in an upper accommodating case is disclosed (see, Patent Document 1, for example).

PRIOR ART DOCUMENT

Patent Document

Patent Document 1: Japanese Patent Laid-Open No. 2014-47551 A

SUMMARY OF THE INVENTION

Incidentally, in the above-described prior-art hydraulic excavator, a large opening portion is formed in the lower accommodating case in order to easily perform a supply work of a reducing agent to the reducing agent tank accommodated inside.

Moreover, the upper accommodating case tends to be large in order to accommodate a spare reducing agent, for example, and a weight of the entire upper accommodating case including accommodated articles also increases. As described above, in the hydraulic excavator according to the prior art, when two accommodating cases are arranged by being stacked vertically, there is a problem that it is difficult to ensure strength of the lower accommodating case.

The present invention was made in view of the above-described problem of the prior art and has an object to provide a construction machine which can ensure strength of the accommodating case.

A construction machine according to the present invention is constituted by an automotive lower traveling structure; an upper revolving structure rotatably mounted on the lower traveling structure; and a working mechanism tiltably provided on the upper revolving structure, wherein the upper revolving structure includes: a revolving frame having a bottom plate and left and right vertical plates provided on the bottom plate and having a connecting pin located on a front side of each of the vertical plates for mounting the working mechanism, an engine mounted on a rear side of the revolving frame, and an oil reservoir tank having a front end located on a rear side from the connecting pin of the revolving frame and arranged on an outer side of one vertical plate of the vertical plates.

A characteristic of the present invention is constitution that, a housing case is provided in the revolving frame at a position on the front side of the oil reservoir tank, the housing case is constituted by including a case-fixing bracket mounted on the revolving frame, a lower accommodating case arranged by surrounding the case-fixing bracket and in which a reducing agent tank storing a reducing agent for purifying an exhaust gas from the engine is accommodated, and an upper accommodating case located on an upper side of the lower accommodating case, the case-fixing bracket is formed by a left leg part, a right leg part, a mounting platform provided on each of the leg parts across the reducing agent tank, and the mounting platform of the case-fixing bracket connects a top surface of the lower accommodating case and a lower surface of the upper accommodating case.

According to the present invention, the case-fixing bracket can be provided on the revolving frame in a state across the reducing agent tank by the left leg part and the right leg part. As a result, the case-fixing bracket can form a framework of the lower accommodating case and the upper accommodating case on the revolving frame. Therefore, the lower accommodating case can be firmly supported on the revolving frame by connecting the upper surface of the lower accommodating case to the mounting platform of the case-fixing bracket and the upper accommodating case can be firmly supported on the revolving frame by connecting the lower surface of the upper accommodating case on the mounting platform of the case-fixing bracket.

As described above, the lower accommodating case and the upper accommodating case can be firmly supported on the revolving frame through the case-fixing brackets, respectively. As a result, even if a large opening portion is formed in the lower accommodating case in order to perform a supply work of a reducing agent to the reducing agent tank accommodated in the lower accommodating case or even if the size of the upper accommodating case increases and the weight increases, strength of the lower accommodating case can be sufficiently ensured.

BRIEF DESCRIPTION OF THE DRAWINGS

FIG. 13 is a sectional view showing a state where a lid member of the lower accommodating case and a lid member of the upper accommodating case are opened at the position similar to that in FIG. 9.

MODE FOR CARRYING OUT THE INVENTION

Figure 1:
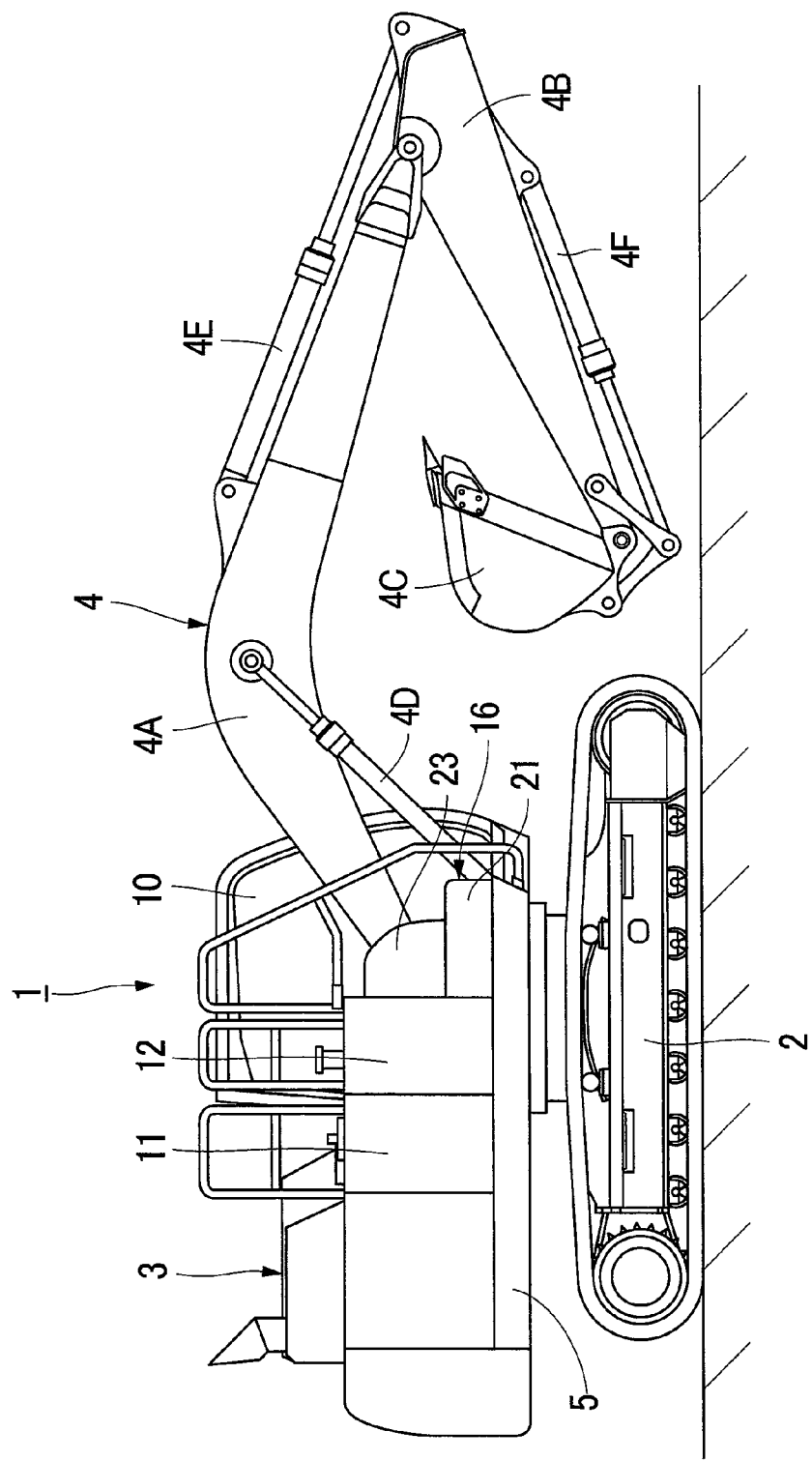
FIG. 1 is a front view showing a hydraulic excavator that is applied to the embodiment of the present invention.

Hereinafter, the embodiment of a construction machine according to the present invention will be explained in detail referring to the attached drawings by taking a case where the construction machine is applied to a crawler-type hydraulic excavator.

In the figures, a hydraulic excavator 1 is a typical example of the construction machine and is used for an excavating work of earth and sand and the like. This hydraulic excavator 1 is constituted by an automotive crawler-type lower traveling structure 2, an upper revolving structure 3 rotatably mounted on the lower traveling structure 2, and a working mechanism 4 tiltably provided on a front side of the upper revolving structure 3. Here, the upper revolving structure 3 is constituted by including a revolving frame 5, an engine 6, a cab 10, a hydraulic oil tank 11, a fuel tank 12, a NOx purifying device 13, a reducing agent tank 14, a case-fixing bracket 17, a lower accommodating case 21, and an upper accommodating case 23, which will be described later.

The working mechanism 4 includes a boom 4A, an arm 4B, and a bucket 4C, and they are rotated by a boom cylinder 4D, an arm cylinder 4E, and a bucket cylinder 4F. a pin through hole 4A2 is formed in a foot part 4A1 which is a base end side of the boom 4A, and the foot part 4A1 of the boom 4A is rotatably connected to the revolving frame 5 which will be described later by using a connecting pin 5G (see, FIG. 3).

Figure 2:
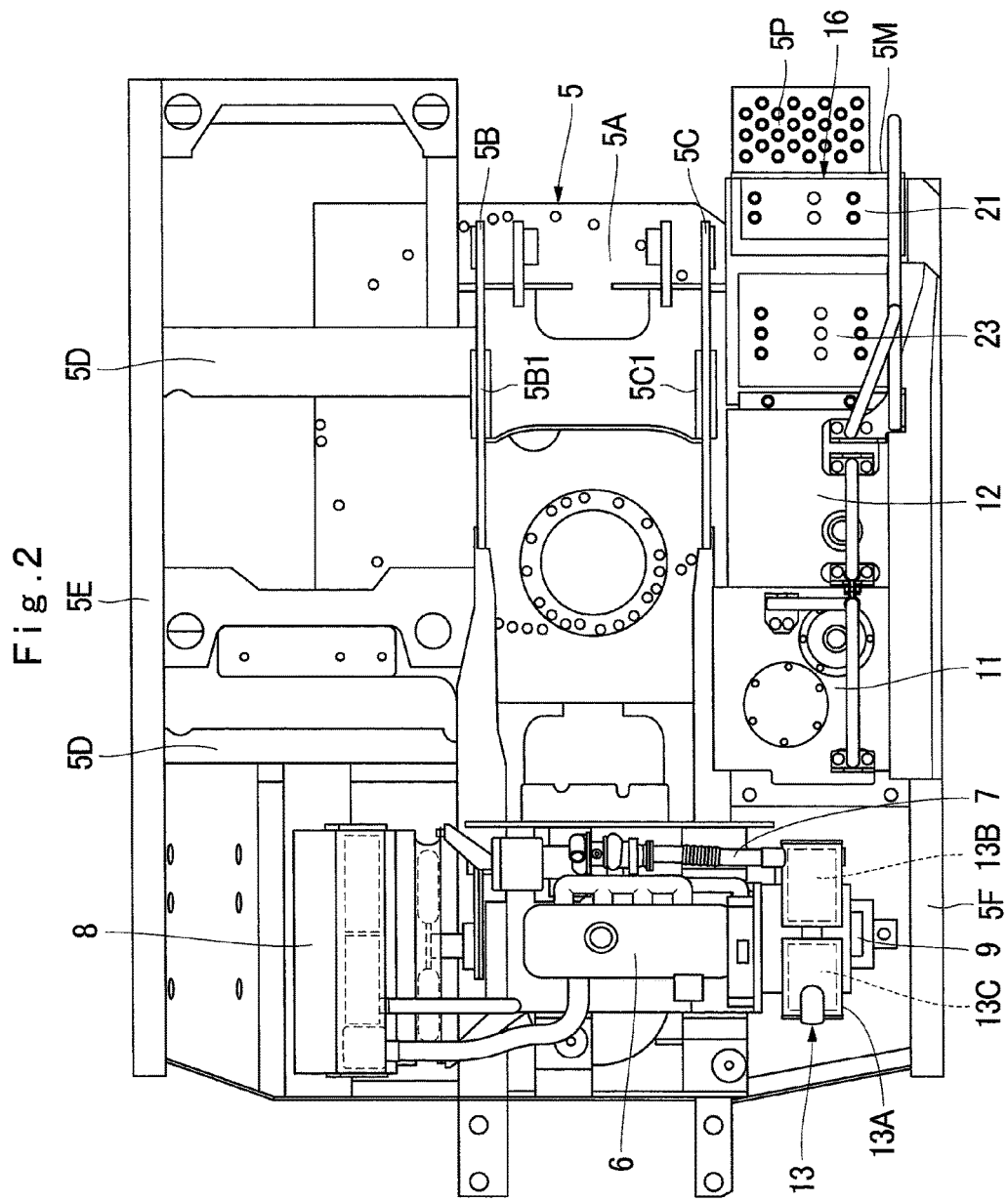
FIG. 2 is a plan view showing a state where an engine, an oil reservoir tank, a lower accommodating case, an upper accommodating case and the like are mounted on a revolving frame.

The revolving frame 5 becomes a base of the upper revolving structure 3 and constitutes a firm support structural body. As shown in FIG. 2, the revolving frame 5 is constituted by including a thick bottom plate 5A extending in a front-rear direction, a left vertical plate 5B and a right vertical plate 5C installed upright on the bottom plate 5A and extending in the front-rear direction with a predetermined interval in aleft-right direction, a plurality of extension beams 5D, a left side frame 5E, and a right side frame 5F. Each of the extension beams 5D extends outward in the left-right direction from the bottom plate 5A and each of the vertical plates 5B and 5C and they are arranged at an interval in the front-rear direction. The left side frame 5E is located on an outer side in the left direction and mounted on a distal end of each of the extension beams 5D and extends in the front-rear direction. The right side frame 5F is located on an outer side in the right direction and mounted on the distal end of each of the extension beams 5D and extends in the front-rear direction.

Figure 3:
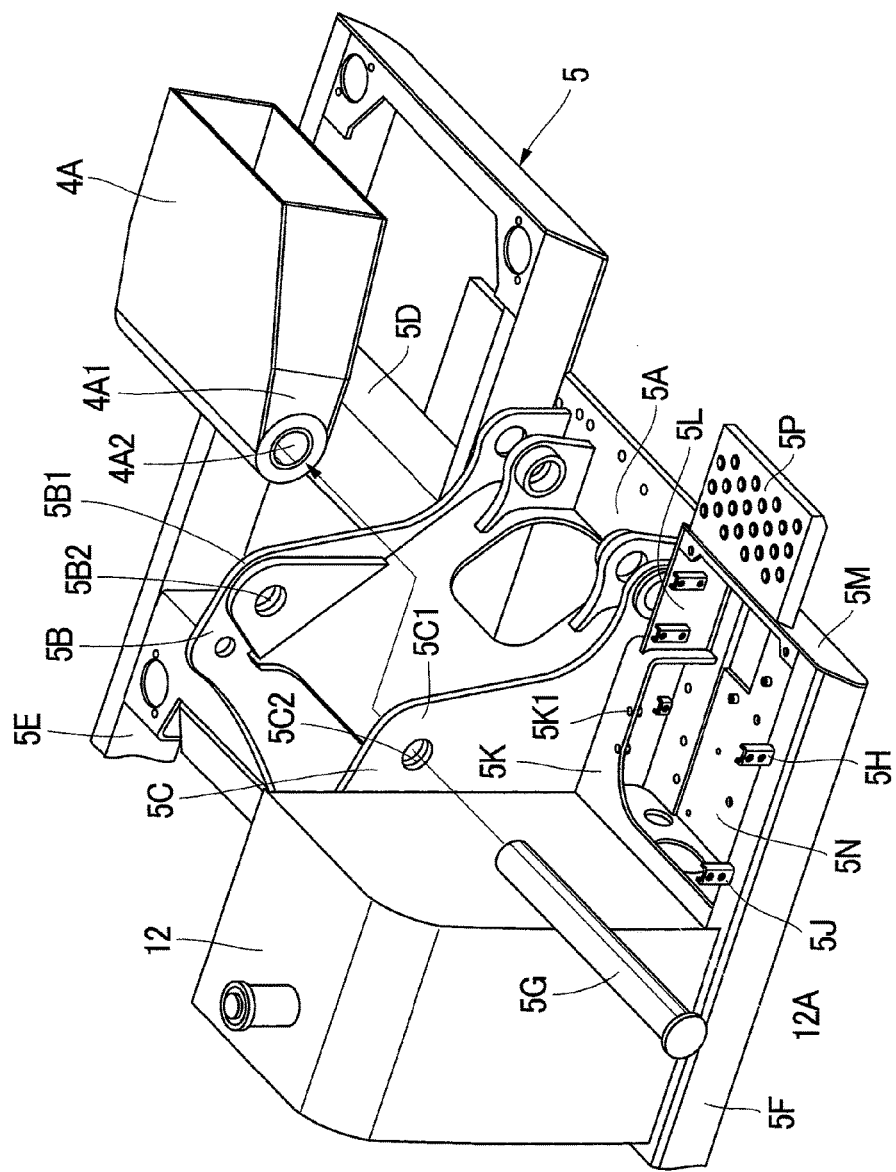
FIG. 3 is a perspective view of a state where a connecting pin is inserted into/removed from the revolving frame showing from diagonally front side of the revolving frame.

As shown in FIG. 3, front side portions of the left and right vertical plates 5B and 5C are boom mounting parts 5B1 and 5C1, respectively. Pin through holes 5B2 and 5C2 penetrating in the left-right direction are formed in upper end sides of the boom mounting parts 5B1 and 5C1, respectively, and these pin through holes 5B2 and 5C2 are arranged coaxially. The foot part 4A1 of the boom 4A is arranged between the left and right vertical plates 5B and 5C, and the connecting pin 5G is inserted in the pin through holes 5B2 and 5C2 of the left and right vertical plates 5B and 5C and in the pin through hole 4A2 of the boom 4A. As a result, the boom 4A is supported rotatably in the vertical direction around the connecting pin 5G with respect to the revolving frame 5.

Figure 4:
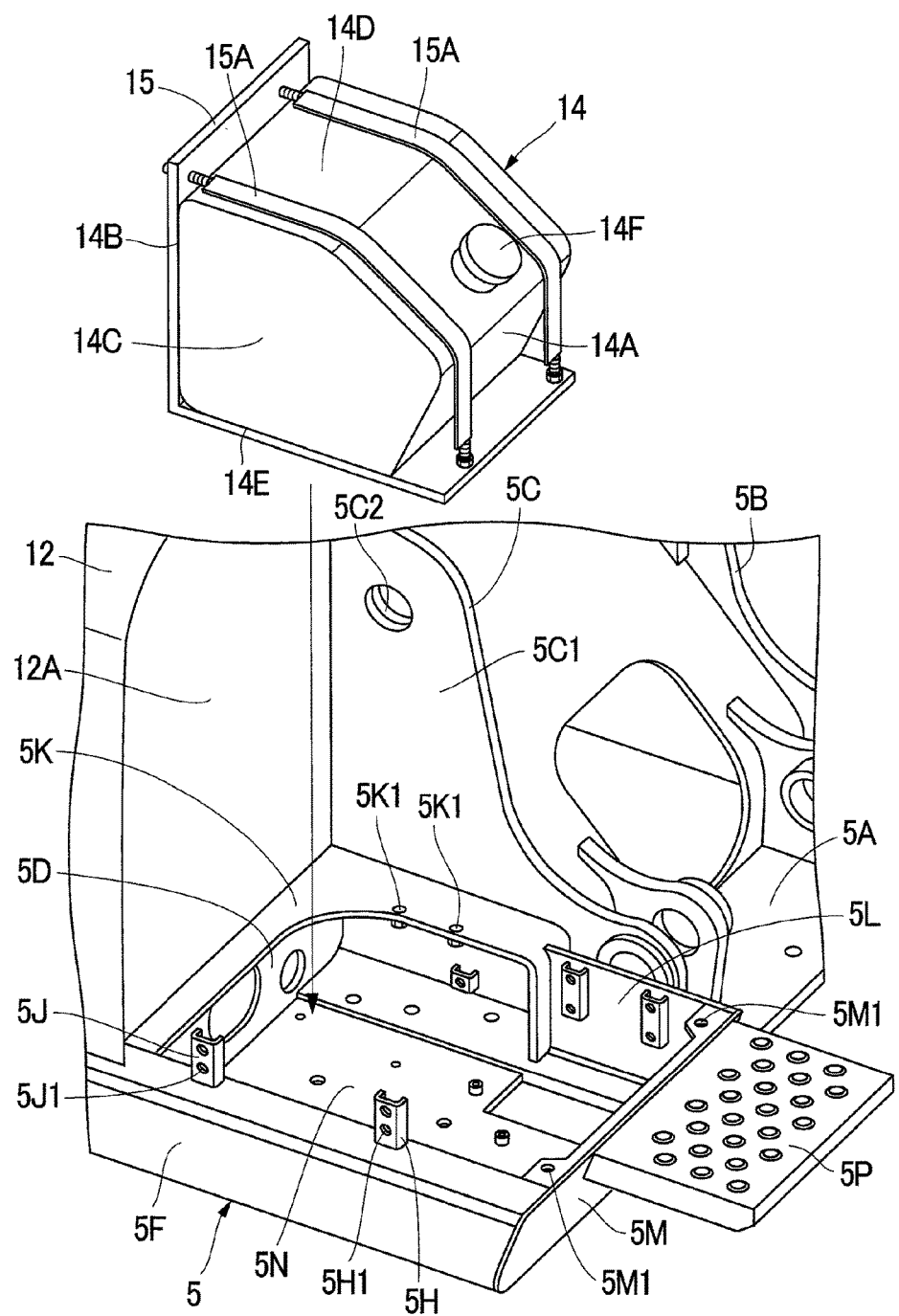
FIG. 4 is an exploded perspective view showing a state of mounting a reducing agent tank on a front right side of the revolving frame.
Figure 5:
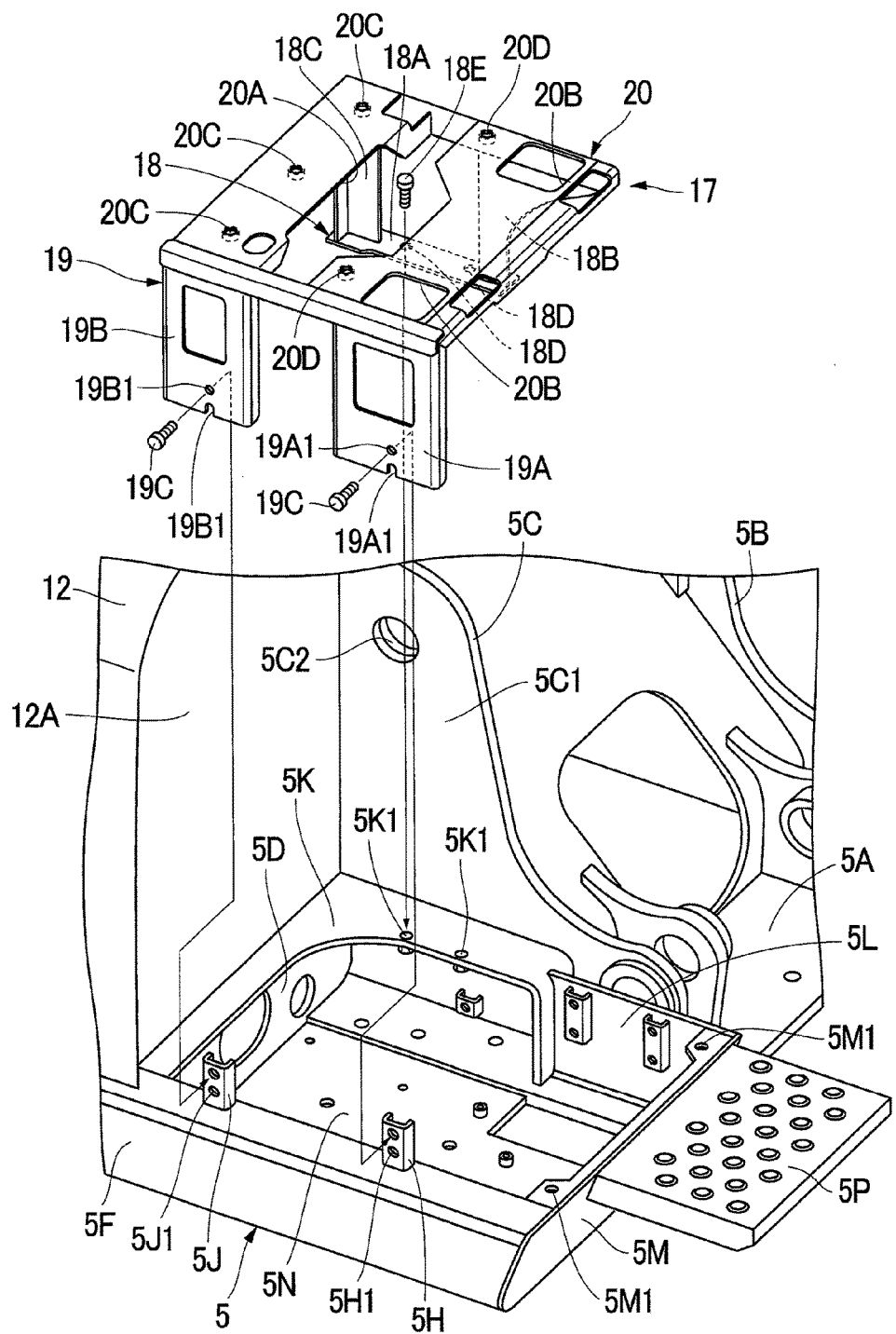
FIG. 5 is an exploded perspective view showing a state of mounting a case-fixing bracket on the front right side of the revolving frame.
Figure 6:
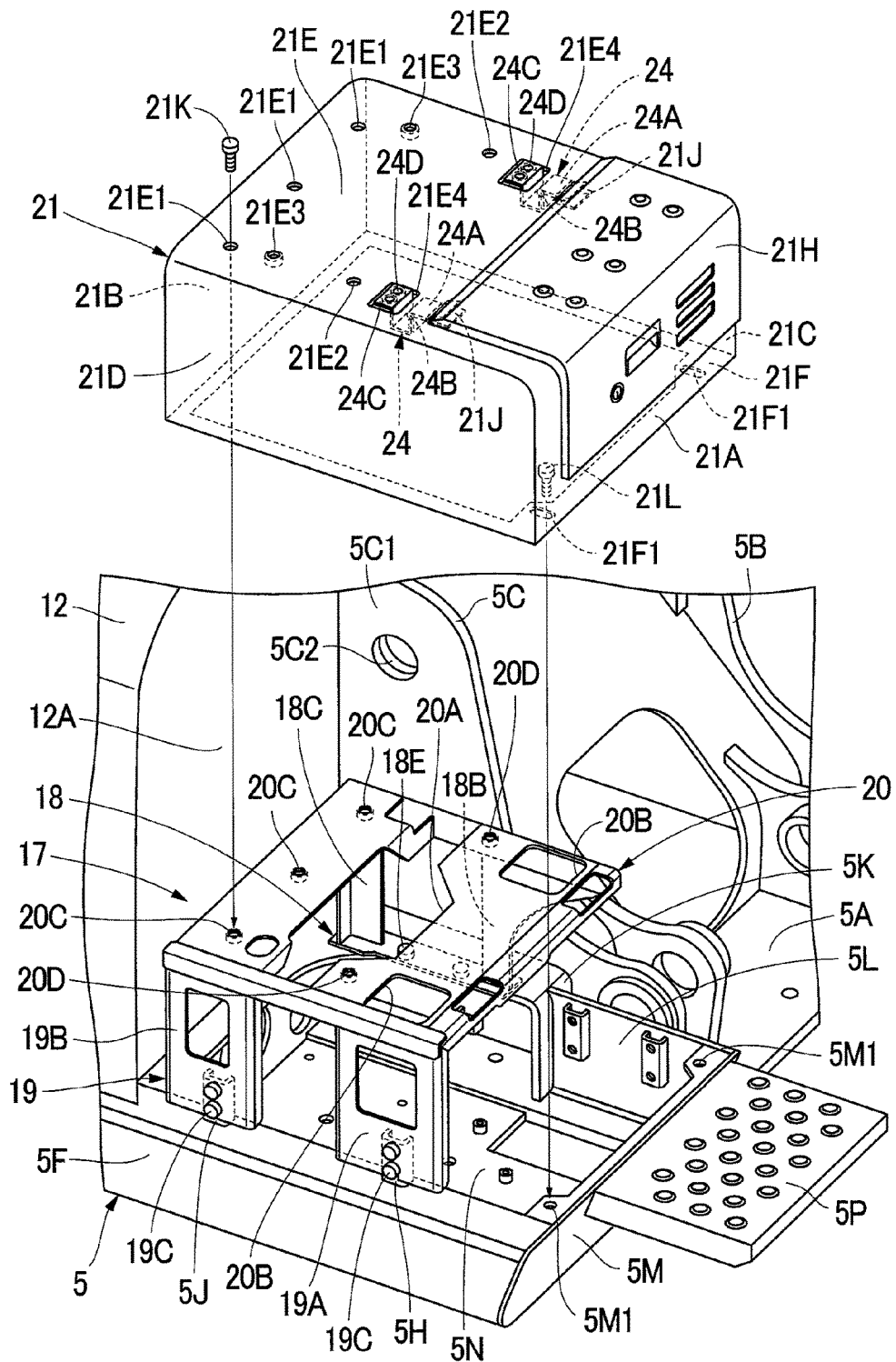
FIG. 6 is an exploded perspective view showing a state of mounting the lower accommodating case to the case-fixing bracket from a position similar to that in FIG. 5.

Here, as shown in FIGS. 4 and 5, two mounting projections 5H and 5J each made of a channel shaped steel having a U-shaped section are provided on an upper surface on a front end side of the right side frame 5F by protruding at an interval in the front-rear direction. Two female screw holes 5H1 and 5J1 penetrating in the left-right direction are provided in each of these mounting projections 5H and 5J separately from each other in a vertical direction. On the other hand, an auxiliary beam 5K having a substantially L-shape is provided between an outer side surface (right side surface) of the boom mounting part 5C1 of the right vertical plate 5C and the right side frame 5F. Two female screw holes 5K1 penetrating in the vertical direction are provided on the right vertical plate 5C side of this auxiliary beam 5K separately from each other in front-rear direction.

A connecting plate 5L faced with the outer side surface (right side surface) of the right vertical plate 5C and extending forward from a front end of the auxiliary beam 5K is provided upright on a right front end side of the bottom plate 5A. Moreover, a front side beam 5M having a height dimension substantially equal to the right side frame 5F is provided between the front end of the right side frame 5F and the front end of the connecting plate 5L. Two female screw holes 5M1 penetrating in the vertical direction are provided on an upper surface of the front side beam 5M separately from each other in the left-right direction. The front side portion of the right side frame 5F, the auxiliary beam 5K, and the front side beam 5M are support platforms for supporting the case-fixing bracket 17 and the lower accommodating case 21, which will be described later.

Here, a right front bottom plate 5N is provided inside surrounded by the front side portion of the right side frame 5F, the auxiliary beam 5K, and the front side beam 5M. Moreover, a footstep plate 5P having a rectangular shape is provided on a front surface of the front side beam 5M by protruding forward. The footstep plate 5P constitutes a first step on which a worker performing maintenance of the engine 6 or the like places the foot at first when getting onboard the upper revolving structure 3 from the lower traveling structure 2.

The engine 6 is mounted on a rear side of the revolving frame 5. The engine 6 is constituted by a diesel engine, for example, and is arranged on the revolving frame 5 in a laterally placed state with an axis of a crank shaft (not shown) extending in the left-right direction. An exhaust pipe 7 for exhausting an exhaust gas is provided in this engine 6.

The engine 6 has good heat efficiency and excellent durability, but harmful substances such as nitrogen oxides (NOx) are exhausted together with the exhaust gas. Thus, the NOx purifying device 13 which will be described later mounted on the exhaust pipe 7 accommodates a urea selective reduction catalyst 13B and an oxidation catalyst 13C for removing the nitrogen oxides (NOx) in an accommodating tubular body 13A.

A heat exchanger 8 is provided on a left side of the engine 6. The heat exchanger 8 is constituted by a radiator for cooling an engine cooling water, an oil cooler for cooling a hydraulic oil, an intercooler for cooling air suctioned by the engine 6 and the like. On the other hand, a hydraulic pump 9 is mounted on a right side of the engine 6. The hydraulic pump 9 supplies the hydraulic oil in the hydraulic oil tank 11 to hydraulic actuators such as each of cylinders 4D, 4E, 4F and the like of the working mechanism 4 by being driven by the engine 6.

The cab 10 is provided on a front left side of the revolving frame 5. The cab 10 is on which an operator gets onboard in order to operate the hydraulic excavator 1 and has an operator's seat on which the operator is seated, levers and pedals for various operations and the like (none of them is shown) disposed therein.

The hydraulic oil tank 11 as an oil reservoir tank is provided on the right side of the revolving frame 5 at a position on a front side of the engine 6. The hydraulic oil tank 11 is to store the hydraulic oil therein and is formed as a cuboid-shaped pressure-resistant tank extending in the vertical direction.

The fuel tank 12 as an oil reservoir tank is provided on the right side of the revolving frame 5 so as to be adjacent to the front side of the hydraulic oil tank 11. The fuel tank 12 is formed as a cuboid-shaped tank for storing a fuel therein. Here, the fuel tank 12 is arranged on an outer side of the right vertical plate 5C which is one of left and right vertical plates 5B and 5C, that is, on the right side of the right vertical plate 5C in a state where a front surface plate 12A which becomes a front end is located on a rear side from the connecting pin 5G (pin through holes 5B2 and 5C2) of the revolving frame 5. As described above, the front surface plate 12A of the fuel tank 12 is arranged on the rear side from the connecting pin 5G so that it does not interfere a work of inserting/removing the connecting pin 5G with respect to each of the vertical plates 5B and 5C (pin through holes 5B2 and 5C2) of the revolving frame 5.

The NOx purifying device 13 is provided on the exhaust pipe 7 of the engine 6. The NOx purifying device 13 is to purify the nitrogen oxides (NOx) in the exhaust gas by using a urea water solution (hereinafter referred to as urea water) which serves as a reducing agent. As shown in FIG. 2, the NOx purifying device 13 is largely constituted by an accommodating tubular body 13A connected to the exhaust pipe 7, a urea selective reduction catalyst 13B accommodated on an upstream side in the accommodating tubular body 13A, an oxidation catalyst 13C arranged on a downstream side of the urea selective reduction catalyst 13B, and a urea water injection valve (not shown) provided on an upstream side of the urea selective reduction catalyst 13B or in the exhaust pipe 7, for example. The urea water injection valve is connected to the reducing agent tank 14, which will be described later, through a supply pipeline or the like (not shown).

Here, the NOx purifying device 13 injects the urea water into the exhaust gas by the urea water injection valve, causes a reduction reaction of NOx in the exhaust gas by using ammonia generated from the urea water by the urea selective reduction catalyst 13B and decomposes it to water and nitrogen. As a result, the NOx purifying device 13 decreases ammonia in the exhaust gas by the oxidation catalyst 13C.

Figure 12:
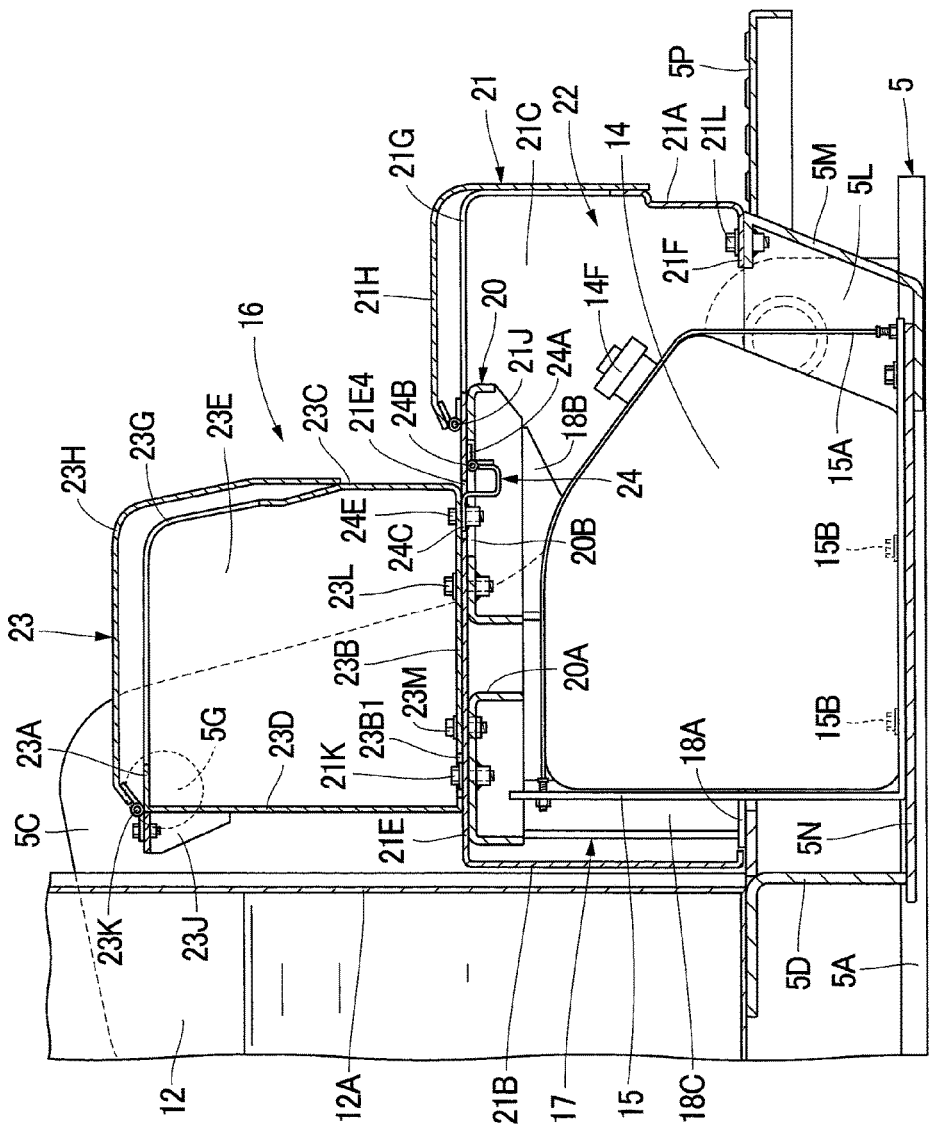
FIG. 12 is a sectional view showing a state where the reducing agent tank is accommodated in the lower accommodating case at the position similar to that in FIG. 9.

The reducing agent tank 14 is provided on the right front bottom plate 5N of the revolving frame 5 at a position on the front side from the front surface plate 12A of the fuel tank 12 (see, FIG. 12). The reducing agent tank 14 is to store the urea water as the reducing agent, and this urea water is supplied into the exhaust gas flowing through the exhaust pipe 7 on the upstream side of the urea selective reduction catalyst 13B of the NOx purifying device 13. As shown in FIG. 4, the reducing agent tank 14 is made of a container surrounded by a front surface part 14A, a rear surface part 14B, left and right side surface parts 14C, a top surface part 14D, and a bottom surface part 14E. A water supply port 14F for supplying the urea water is provided on a front side portion of the top surface part 14D by protruding diagonally upward.

The reducing agent tank 14 is fastened to a tank support plate 15 bent having an L-shape by using a belt 15A. The tank support plate 15 is fixed to the right front bottom plate 5N of the revolving frame 5 by using a plurality of bolts 15B. As a result, the reducing agent tank 14 is mounted on the right front bottom plate 5N of the revolving frame 5 through the tank support plate 15 so as to be contained in a tank accommodating space 22 which will be described later.

Next, a housing case 16 provided on the front right side of the revolving frame 5 will be described. This housing case 16 is arranged on the front side of the fuel tank 12 and is constituted by including the case-fixing bracket 17, the lower accommodating case 21, and the upper accommodating case 23, which will be described leter.

The case-fixing bracket 17 is located on the right side of the right vertical plate 5C which is one vertical plate of the vertical plates 5B and 5C of the revolving frame 5 and is mounted on the revolving frame 5 on the front side from the front surface plate 12A of the fuel tank 12. This case-fixing bracket 17 has the lower accommodating case 21 and the upper accommodating case 23 connected (fixed). Here, as shown in FIGS. 5 and 12, the case-fixing bracket 17 is constituted by a left leg part 18 and a right leg part 19 across the reducing agent tank 14 mounted on the right front bottom plate 5N of the revolving frame 5 and a mounting platform 20 connecting upper ends of the left and right leg parts 18 and 19 to each other and arranged above the reducing agent tank 14. Moreover, the case-fixing bracket 17 is arranged in the lower accommodating case 21 in a state mounted on the revolving frame 5.

The left leg part 18 of the case-fixing bracket 17 is constituted by including a lower plate 18A having a rectangular shape placed on the auxiliary beam 5K of the revolving frame 5 and extending in the front-rear direction, a left front leg 18B provided upright from a front end of the lower plate 18A, and a left rear leg 18C provided upright from a rear end of the lower plate 18A. The left front leg 18B and the left rear leg 18C are formed by using a steel plate or the like bent into an L-shape, for example, and is fixed to the upper surface of the lower plate 18A by using means such as welding. As a result, the firm left leg part 18 in which the lower plate 18A, the left front leg 18B, and the left rear leg 18C are integrated is formed. Two bolt through holes 18D corresponding to each of the female screw holes 5K1 provided in the auxiliary beam 5K of the revolving frame 5 are provided in the lower plate 18A separately from each other in the front-rear direction.

The right leg part 19 of the case-fixing bracket 17 is constituted by including a right front leg 19A faced with the left front leg 18B of the left leg part 18 in the left-right direction and a right rear leg 19B faced with the left rear leg 18C of the left leg part 18 in the left-right direction. The right front leg 19A is formed by using a steel plate or the like bent into a U-shape, for example. Two bolt through holes 19A1 corresponding to the female screw holes 5H1 provided in the mounting projections 5H of the revolving frame 5 are provided on a lower end side located at a middle part in the front-rear direction of the right front leg 19A separately from each other in the vertical direction. The right rear leg 19B is also formed by using a steel plate or the like bent into a U-shape, for example. Two bolt through holes 19B1 corresponding to the female screw holes 5J1 provided in the mounting projections 5J of the revolving frame 5 are provided on a lower end side located at a middle part in the front-rear direction of the right rear leg 19B separately from each other in the vertical direction. One on the lower side of the two bolt through holes 19A1 provided in the right front leg 19A and one on the lower side in the two bolt through holes 19B1 provided in the right rear leg 19B are formed each having a long groove shape opened on the lower end side, respectively.

Figure 10:
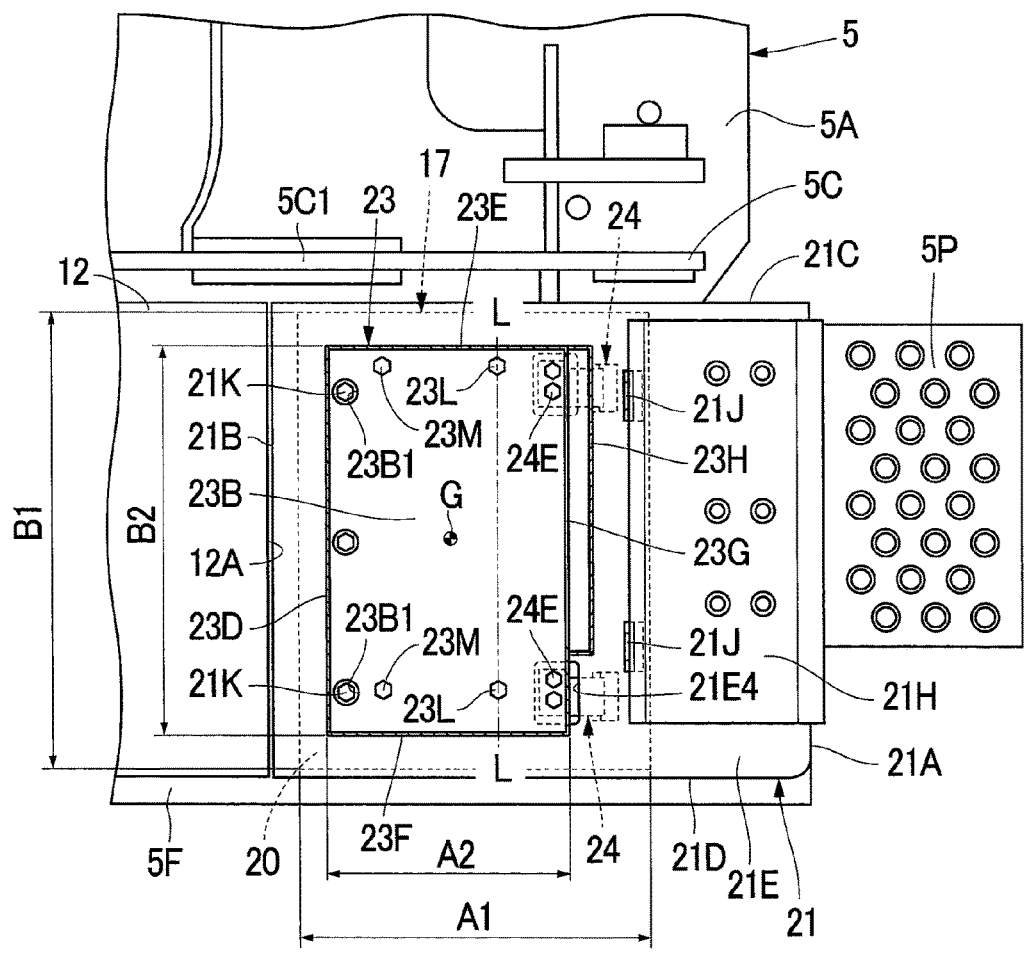
FIG. 10 is a sectional view of the case-fixing bracket, the lower accommodating case, the upper accommodating case and the like from an arrow X-X direction in FIG. 9.

The mounting platform 20 of the case-fixing bracket 17 is formed by a plate body having a substantially regular square shape on a plan view (seen from above). Both ends in the left-right direction and both ends in the front-rear direction of the mounting platform 20 are bent downward, respectively. A left end portion of the mounting platform 20 is fixed to upper end portions of the left front leg 18B and the left rear leg 18C constituting the left leg part 18 by using means such as welding. A right end portion of the mounting platform 20 is fixed to upper end portions of the right front leg 19A and the right rear leg 19B constituting the right leg part 19 by using means such as welding. Here, as shown in FIG. 10, a length dimension A1 in the front-rear direction of the mounting platform 20 is set larger than a length dimension A2 in the front-rear direction of a lower surface 23B of the upper accommodating case 23 which will be described later. A length dimension B1 of the mounting platform 20 in the left-right direction is set larger than a length dimension B2 of the lower surface 23B of the upper accommodating case 23 in the left-right direction. That is, the mounting platform 20 is set to a size equal to or larger than the lower surface 23B of the upper accommodating case 23 and is constituted so as to be capable of reliably supporting the entire upper accommodating case 23 from the lower side.

A center opening part 20A extending over the whole region in the left-right direction for weight reduction is provided at a center part of the mounting platform 20 in the front-rear direction. Two angular holes 20B are provided on a front part of the mounting platform 20 separately from each other in the left-right direction in order to accommodate a hinge mechanism 24 which will be described later. Here, three rear female screw holes 20C penetrating in the vertical direction are formed on a rear side (left rear leg 18C and right rear leg 19B sides) from the center opening part 20A in the mounting platform 20 at an interval in the left-right direction. On the other hand, two front female screw holes 20D penetrating in the vertical direction are formed between the center opening part 20A and the left and right angular holes 20B of the mounting platform 20 at an interval in the left-right direction. In this case, the rear female screw hole 20C and the front female screw hole 20D are constituted by through holes drilled in the mounting platform 20 and nuts welded to the lower surface of the mounting platform 20 at positions coaxial with the through holes.

The case-fixing bracket 17 is constituted by the aforementioned left leg part 18, the right leg part 19, and the mounting platform 20. Here, the case-fixing bracket 17 brings the lower plate 18A of the left leg part 18 into contact with the auxiliary beam 5K of the revolving frame 5 and brings the right front leg 19A and the right rear leg 19B of the right leg part 19 into contact with the mounting projections 5H and 5J of the revolving frame 5, respectively. As a result, the case-fixing bracket 17 is arranged on the revolving frame 5. In this state, a bolt 18E is inserted into the bolt through hole 18D of the lower plate 18A, and this bolt 18E is screwed into the female screw hole 5K1 of the auxiliary beam 5K. Moreover, a bolt 19C on the front side is inserted into each of the bolt through holes 19A1 of the right front leg 19A, and this bolt 19C is screwed into the female screw hole 5H1 of the mounting projection 5H. Further, the bolt 19C on the rear side is inserted into each of the bolt through holes 19B1 of the right rear leg 19B, and this bolt 19C on the rear side is screwed into the female screw hole 5J1 of the mounting projection 5J. As a result, the case-fixing bracket 17 is firmly mounted on the revolving frame 5 at a position on the front side of the fuel tank 12 in the state across the reducing agent tank 14 by the left and right leg parts 18 and 19.

The lower accommodating case 21 is arranged on the front side of the fuel tank 12 in a state surrounding the case-fixing bracket 17 from the upper side and placed on the mounting platform 20. The reducing agent tank 14 is accommodated inside the lower accommodating case 21. Here, the lower accommodating case 21 has a length dimension in the front-rear direction from the front surface plate 12A of the fuel tank 12 to the front end of the front side beam 5M of the revolving frame 5 and a width dimension equal to a width dimension of the fuel tank 12 and is formed having a cuboid box shape which is flat in the vertical direction.

That is, the lower accommodating case 21 is constituted by a front surface part 21A, a rear surface part 21B, a left side surface part 21C, a right side surface part 21D, a top surface part 21E, and a lower frame part 21F. The front surface part 21A is provided upright from the front end of the front side beam 5M of the revolving frame 5 and extends in the left-right direction, and the rear surface part 21B is faced with the front surface plate 12A of the fuel tank 12 and extends in the left-right direction. The left side surface part 21C connects the front surface part 21A and a left end portion of the rear surface part 21B and extends in the front-rear direction, and the right side surface part 21D connects the front surface part 21A and a right end portion of the rear surface part 21B and extends in the front-rear direction. The top surface part 21E closes upper sides of the front surface part 21A, the rear surface part 21B, the left side surface part 21C, and the right side surface part 21D, while the lower frame part 21F is provided on lower ends of the front surface part 21A, the rear surface part 21B, the left side surface part 21C, and the right side surface part 21D. Here, the lower frame part 21F is formed by an angular frame-shaped plate body having a center part largely open. As a result, the lower accommodating case 21 has a bottom-out structure and defines a large tank accommodating space 22 between the lower accommodating case 21 and the right front bottom plate 5N of the revolving frame 5.

An opening part 21G which is wide in the left-right direction is formed on the front side of the lower accommodating case 21. The opening part 21G is formed between the front surface part 21A and the top surface part 21E. This opening part 21G is arranged at a position corresponding to the water supply port 14F of the reducing agent tank 14 arranged in the tank accommodating space 22. On the other hand, a lid member 21H bent having an L-shape along the front surface part 21A and the top surface part 21E is provided on the front side of the lower accommodating case 21, and this lid member 21H covers the opening part 21G capable of opening/closing. Two hinges 21J are provided between a rear end portion of the lid member 21H and the top surface part 21E separately from each other in the left-right direction. The lid member 21H opens/closes the opening part 21G of the lower accommodating case 21 by rotating in the vertical direction around each of the hinges 21J (see, FIG. 13).

Here, a height dimension of the lower accommodating case 21 is set lower than the connecting pin 5G of the revolving frame 5, that is, set to such a dimension that the top surface part 21E of the lower accommodating case 21 comes to lower sides of the pin through holes 5B2 and 5C2 formed in each of the vertical plates 5B and 5C of the revolving frame 5. An upper surface of the lid member 21H provided on the lower accommodating case 21 forms a second step subsequent to the footstep plate 5P provided on the front side beam 5M of the revolving frame 5.

Here, three rear bolt through holes 21E1 corresponding to each of the rear female screw holes 20C provided in the mounting platform 20 of the case-fixing bracket 17 and two front bolt through holes 21E2 corresponding to each of the front female screw holes 20D provided in the mounting platform 20 are provided in the top surface part 21E of the lower accommodating case 21. Two female screw holes 21E3 are provided in the top surface part 21E of the lower accommodating case 21 separately from each other in the left-right direction at positions between each of the rear bolt through holes 21E1 and each of the front bolt through holes 21E2. The female screw hole 21E3 is constituted by a through hole drilled in the top surface part 21E and a nut welded to a lower surface of the top surface part 21E at a position coaxial with this through hole.

Furthermore, left and right angular holes 21E4 are formed on the front sides of the left and right front bolt through holes 21E2 by penetrating in the vertical direction. A movable piece 24C of the hinge mechanism 24 which will be described later is inserted in each of these angular holes 21E4. On the other hand, two bolt insertion holes 21F1 each having long hole shape extending in the front-rear direction are provided on the front side of the lower frame part 21F of the lower accommodating case 21. These bolt insertion holes 21F1 correspond to two female screw holes 5M1 provided in the front side beam 5M of the revolving frame 5, respectively.

The lower accommodating case 21 is arranged on the mounting platform 20 in a state where its top surface part 21E is brought into contact with the mounting platform 20 of the case-fixing bracket 17. In this state, a bolt 21K is inserted into each of the rear bolt through holes 21E1 of the top surface part 21E, and this bolt 21K is screwed into the rear female screw hole 20C of the mounting platform 20. A bolt 21L is inserted into each of the bolt insertion holes 21F1 of the lower frame part 21F, and this bolt 21L is screwed into the female screw hole 5M1 provided in the front side beam 5M of the revolving frame 5.

As a result, the top surface part 21E of the lower accommodating case 21 is connected (fixed) to the mounting platform 20 of the case-fixing bracket 17. In this state, the lower accommodating case 21 is arranged by surrounding the left and right leg parts 18 and 19 of the case-fixing bracket 17 and the mounting platform 20 from the front-rear direction, from the left-right direction, and from above. Therefore, the tank accommodating space 22 having a large capacity is formed between the lower accommodating case 21 and the right front bottom plate 5N of the revolving frame 5, and the reducing agent tank 14 can be accommodated in this tank accommodating space 22.

Figure 8:
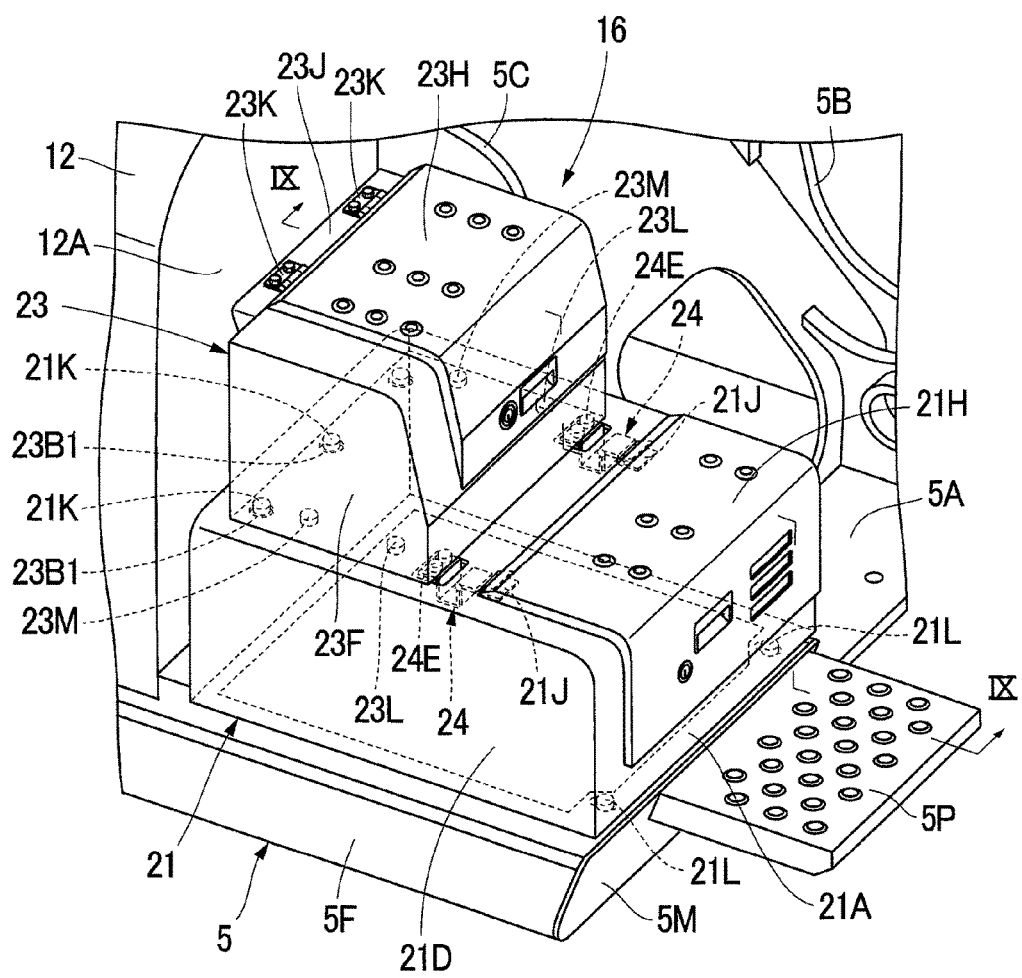
FIG. 8 is a perspective view showing a state where the lower accommodating case and the upper accommodating case are arranged on the front right side of the revolving frame.

The upper accommodating case 23 is mounted on the mounting platform 20 of the case-fixing bracket 17 in the state located on an upper side of the lower accommodating case 21. An article accommodating space for accommodating a spare reducing agent, a tool box and the like (none of them is shown) is formed inside the upper accommodating case 23. The upper accommodating case 23 has a length dimension in the front-rear direction set to approximately a half of a length dimension of the lower accommodating case 21 in the front-rear direction, and as shown in FIG. 8, it is stacked on the lower accommodating case 21 on the rear side from the lid member 21H. Here, the upper accommodating case 23 is constituted as a box structural body which is long in the left-right direction and surrounded by a top surface 23A, the lower surface 23B, a front surface 23C, a rear surface 23D, a left side surface 23E and a right side surface 23F.

A wide opening part 23G extending in the left-right direction over the top surface 23A and the front surface 23C is formed in the upper accommodating case 23, and a lid member 23H covering this opening part 23G, capable of opening/closing is provided on the opening part 23G. The lid member 23H extends in the left-right direction while bending having an L-shape along the top surface 23A and the front surface 23C. A hinge mounting plate 23J is provided on an upper end of the rear surface 23D of the upper accommodating case 23 by protruding rearward. A hinge 23K is provided between the hinge mounting plate 23J and the rear end of the lid member 23H. Therefore, the lid member 23H opens/closes the opening part 23G of the upper accommodating case 23 by rotating in the vertical direction around the hinge 23K (see, FIG. 13).

Figure 9:
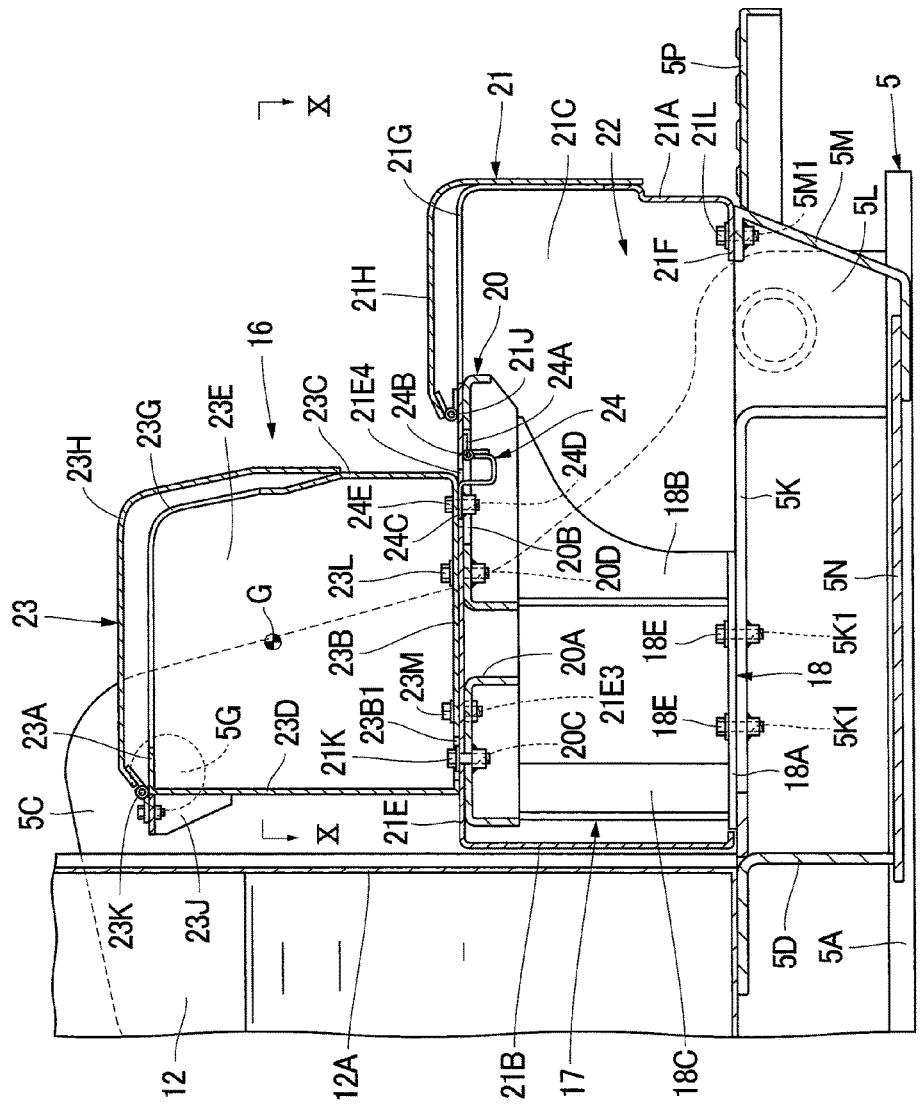
FIG. 9 is a sectional view of the revolving frame, the case-fixing bracket, the lower accommodating case, the upper accommodating case and the like showing from an arrow IX-IX direction in FIG. 8.

Here, three through holes 23B1 are provided in the lower surface 23B of the upper accommodating case 23 at positions corresponding to the rear bolt through holes 21E1 provided in the lower accommodating case 21, respectively. Each of these through holes 23B1 has a hole diameter larger than a head part of the bolt 21K for fastening the lower accommodating case 21 to the case-fixing bracket 17 (mounting platform 20). As shown in FIG. 9, each of the through holes 23B1 has the head part of the bolt 21K loosely inserted when the upper accommodating case 23 is arranged on the lower accommodating case 21. Two front bolt through holes 23B2 are provided in the lower surface 23B of the upper accommodating case 23 at positions corresponding to the front bolt through holes 21E2 provided in the lower accommodating case 21, and two rear bolt through holes 23B3 are provided in the lower surface 23B of the upper accommodating case 23 at positions corresponding to the female screw holes 21E3 provided in the lower accommodating case 21, respectively. Moreover, two each of hinge mounting bolt through holes 23B4 in the left-right direction, that is, four hinge mounting bolt through holes 23B4 in total are provided in the lower surface 23B of the upper accommodating case 23, in the vicinity of a corner part crossing the front surface 23C at positions corresponding to female screw holes 24D of the hinge mechanism 24 which will be described later.

The upper accommodating case 23 is arranged on the lower accommodating case 21 in a state where its lower surface 23B is brought into contact with the top surface part 21E of the lower accommodating case 21. The head parts of the three bolts 21K protruding from the top surface part 21E of the lower accommodating case 21 are accommodated in the upper accommodating case 23 through the through holes 23B1 of the upper accommodating case 23.

In this state, a bolt 23L is inserted into the front bolt through hole 23B2 of the upper accommodating case 23 and moreover, this bolt 23L is screwed into the front female screw hole 20D of the case-fixing bracket 17 (mounting platform 20) through the front bolt through hole 21E2 of the lower accommodating case 21. Moreover, a bolt 23M is inserted into the rear bolt through hole 23B3 of the upper accommodating case 23, and this bolt 23M is screwed into the female screw hole 21E3 provided in the lower accommodating case 21. As a result, the lower surface 23B of the upper accommodating case 23 is connected (fixed) to the mounting platform 20 of the case-fixing bracket 17 directly or through the lower accommodating case 21.

As described above, the upper accommodating case 23 is placed on the lower accommodating case 21 at a position rear from the lid member 21H of the lower accommodating case 21. In this state, the upper surface of the lid member 23H provided on the upper accommodating case 23 forms a third step subsequent to the footstep plate 5P provided on the front side beam 5M of the revolving frame 5 and the lid member 21H provided on the lower accommodating case 21.

Here, the upper accommodating case 23 is arranged on an extension of an axis of the connecting pin 5G connecting the revolving frame 5 and the boom 4A of the working mechanism 4 (see, FIG. 9). Thus, the left and right hinge mechanisms 24 are provided between the lower accommodating case 21 and the upper accommodating case 23. Each of the hinge mechanisms 24 is to rotate the upper accommodating case 23 to a position out of the extension in the axial direction of the connecting pin 5G when the connecting pin 5G of the revolving frame 5 is inserted/removed.

Figure 7:
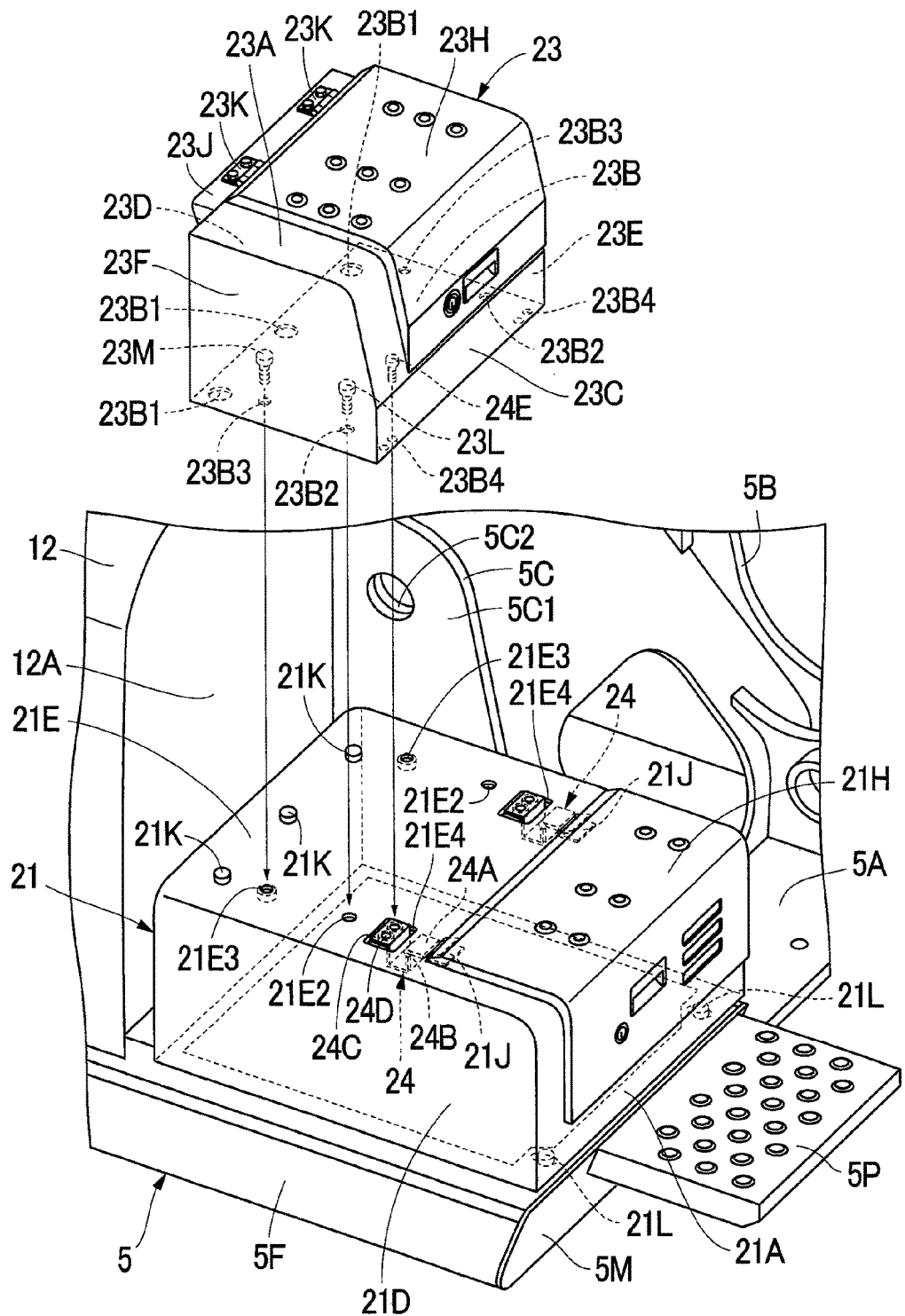
FIG. 7 is an exploded perspective view showing a state of mounting the upper accommodating case on the lower accommodating case from a position similar to that in FIG. 5.

As shown in FIGS. 7 to 9, each of the hinge mechanisms 24 is constituted by including a fixing piece 24A, and a movable piece 24C rotatably connected to the fixing piece 24A through a shaft 24B, and two female screw holes 24D using welding nuts are provided in the movable piece 24C. The fixing piece 24A is located in the vicinity of the angular hole 21E4 formed in the top surface part 21E of the lower accommodating case 21 and is fixed to a back surface side of the top surface part 21E (inner side of the lower accommodating case 21) by welding or the like. The movable piece 24C is faced with the lower surface 23B of the upper accommodating case 23 through the angular hole 21E4 of the lower accommodating case 21.

Figure 11:
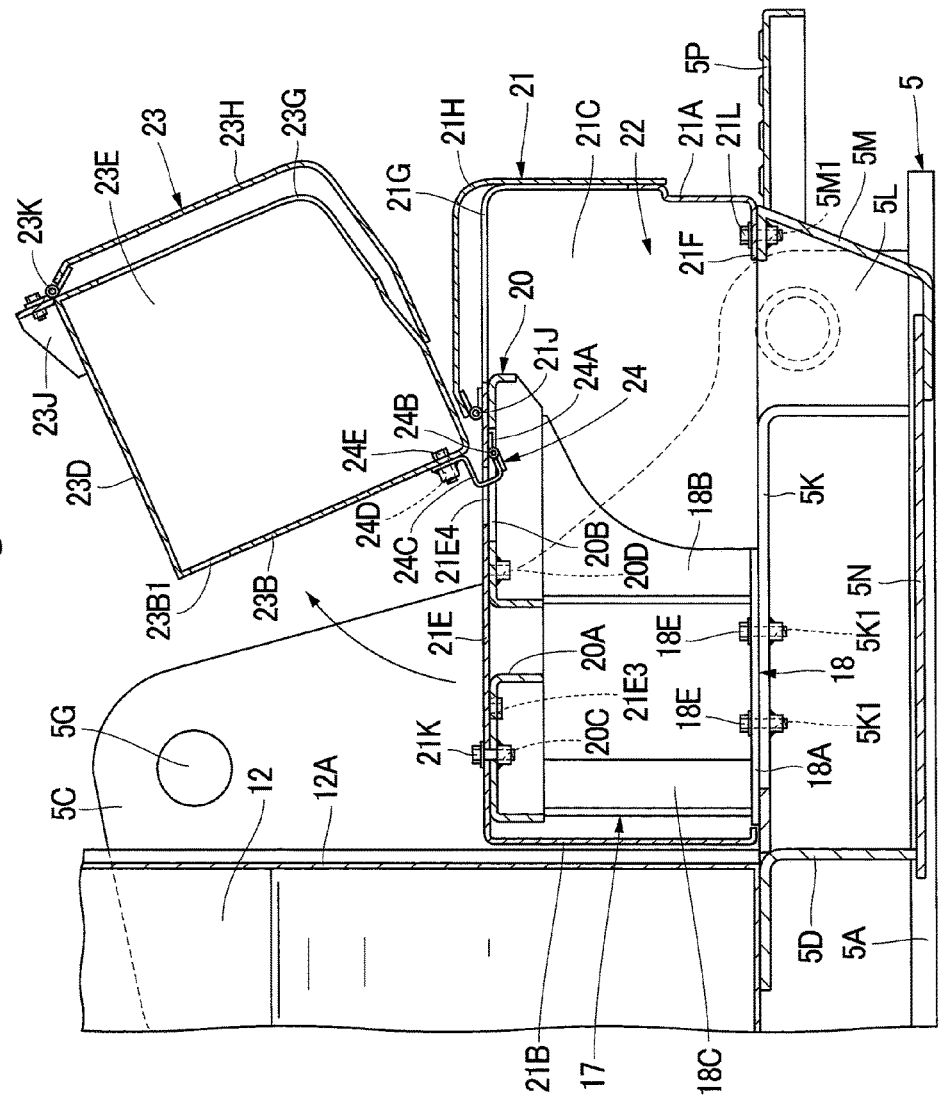
FIG. 11 is a sectional view showing a state where the upper accommodating case is rotated around a hinge mechanism at a position similar to that in FIG. 9.

Then, the bolt 24E is inserted into each of the hinge mounting bolt through holes 23B4 provided in the lower surface 23B of the upper accommodating case 23, and this bolt 24E is screwed into the female screw hole 24D provided in the movable piece 24C of the hinge mechanism 24. As a result, a lower front part of the upper accommodating case 23 can be connected to the lower accommodating case 21 through the hinge mechanism 24. Therefore, when the connecting pin 5G of the revolving frame 5 is to be inserted/removed, the bolt 23L fastening the upper accommodating case 23 to the case-fixing bracket 17 is removed, and the bolt 23M fastening the upper accommodating case 23 to the lower accommodating case 21 is removed. As a result, as shown in FIG. 11, the upper accommodating case 23 is rotated to a position out of the extension in the axial direction of the connecting pin 5G around the shaft 24B of the hinge mechanism 24.

In this case, as shown in FIGS. 9 and 10, assuming that the center of gravity of the upper accommodating case 23 is G, the two bolts 23L fixing the upper accommodating case 23 to the case-fixing bracket 17 are arranged on a virtual line L-L extending in the left-right direction between the center of gravity G of the upper accommodating case 23 and the left and right hinge mechanisms 24 on a plan view. That is, the upper accommodating case 23 is mounted on the case-fixing bracket 17 by using the bolt 23L on the virtual line L-L between the center of gravity G and the left and right hinge mechanisms 24 on a plan view. As described above, the upper accommodating case 23 is mounted on the case-fixing bracket 17 at a position slightly shifted to a front side from its center of gravity G (on the hinge mechanism 24 side). As a result, even if vibration or twisting occurs during operation of the hydraulic excavator 1, the portion close to the center of gravity G can be fixed and thus, vibration of the upper accommodating case 23 can be suppressed.

The hydraulic excavator 1 according to this embodiment has the constitution as described above and subsequently, its operation will be described.

The operator who got on board on the cab 10 drives the hydraulic pump 9 by starting the engine 6. The lower traveling structure 2 can be advanced or retreated by operating a lever for running or the like in this state. On the other hand, the working mechanism 4 can be moved upward/downward so as to perform an excavating work of earth and sand or the like by operating a work lever.

During the operation of the engine 6, nitrogen oxides (NOx) which are harmful substances are exhausted from the exhaust pipe 7. At this time, the urea water in the reducing agent tank 14 is supplied to the urea water injection valve of the NOx purifying device 13, and the NOx purifying device 13 generates ammonia by injecting the urea water into the exhaust gas from the urea water injection valve. As a result, the urea selective reduction catalyst 13B reduces the nitrogen oxides into water and nitrogen and ejects to an outside via the oxidation catalyst 13C, whereby an emission of the nitrogen oxides can be reduced.

Here, in this embodiment, the reducing agent tank 14 is provided on the right front bottom plate 5N of the revolving frame 5 at the position on the front side from the front surface plate 12A of the fuel tank 12. Moreover, the housing case 16 constituted by including the case-fixing bracket 17, the lower accommodating case 21, and the upper accommodating case 23 is provided on the front right side of the revolving frame 5 at the position on the front side from the front surface plate 12A of the fuel tank 12. In this case, the case-fixing bracket 17 is mounted on the front side portion of the right side frame 5F and the auxiliary beam 5K in the revolving frame 5. That is, the right leg part 19 of the case-fixing bracket 17 is mounted on the mounting projections 5H and 5J provided on the front side portion of the right side frame 5F by using the bolt 19C. The left leg part 18 of the case-fixing bracket 17 is mounted on the auxiliary beam 5K by using the bolt 18E. As a result, the case-fixing bracket 17 is firmly mounted on the revolving frame 5 in the state across the reducing agent tank 14 with a gap by the left and right leg parts 18 and 19. Therefore, the case-fixing bracket 17 can constitute a firm framework for supporting the lower accommodating case 21 and the upper accommodating case 23 on the right front bottom plate 5N of the revolving frame 5 in a state where interference with the reducing agent tank 14 is avoided.

The lower accommodating case 21 is arranged by surrounding the left and right leg parts 18 and 19 of the case-fixing bracket 17 and the mounting platform 20, and the top surface part 21E of the lower accommodating case 21 is fixed (connected) to the case-fixing bracket 17 by using the bolt 21K. Moreover, the lower frame part 21F of the lower accommodating case 21 is fixed to the front side beam 5M of the revolving frame 5 by using the bolt 21L. Furthermore, the upper accommodating case 23 is arranged on the lower accommodating case 21, and the lower surface 23B of the upper accommodating case 23 is fixed (connected) to the case-fixing bracket 17 by using the bolt 23L and is also fixed to the lower accommodating case 21 by using the bolt 23M.

As described above, the case-fixing bracket 17 is mounted on the revolving frame 5, and the top surface part 21E of the lower accommodating case 21 and the lower surface 23B of the upper accommodating case 23 are connected to this case-fixing bracket 17. Therefore, the lower accommodating case 21 and the upper accommodating case 23 can be firmly mounted on the revolving frame 5 through the case-fixing bracket 17. As a result, even if the large opening part 21G is formed in the lower accommodating case 21 in order to perform the supply work of the reducing agent to the reducing agent tank 14 accommodated in the lower accommodating case 21 or even if the size of the upper accommodating case 23 increases and the weight increases, the strength of the lower accommodating case 21 can be sufficiently ensured.

Moreover, the case-fixing bracket 17 is arranged in the state across the reducing agent tank 14 by the left and right leg parts 18 and 19, and the lower accommodating case 21 surrounds the left and right leg parts 18 and 19 of the case-fixing bracket 17 and the mounting platform 20. As a result, the tank accommodating space 22 formed inside the lower accommodating case 21 (between the right front bottom plate 5N of the revolving frame 5 and the lower accommodating case 21) can be ensured large. As a result, the reducing agent tank 14 with a large capacity can be accommodated in the lower accommodating case 21.

On the other hand, the length dimension A1 in the front-rear direction of the mounting platform 20 constituting the case-fixing bracket 17 is set larger than the length dimension A2 in the front-rear direction of the lower surface 23B of the upper accommodating case 23, and the length dimension B1 in the left-right direction of the mounting platform 20 is set larger than the length dimension B2 in the left-right direction of the lower surface 23B of the upper accommodating case 23. As described above, by setting the size of the mounting platform 20 of the case-fixing bracket 17 equal to or larger than that of the lower surface 23B of the upper accommodating case 23, the case-fixing bracket 17 can reliably support the entire upper accommodating case 23 from the lower side and can improve the strength of the upper accommodating case 23.

Further, the upper accommodating case 23 is arranged on the extension of the axis of the connecting pin 5G connecting the revolving frame 5 and the boom 4A of the working mechanism 4. The left and right hinge mechanisms 24 are provided between the lower accommodating case 21 and the upper accommodating case 23. Each of the hinge mechanisms 24 can rotate the upper accommodating case 23 to the position out of the extension in the axial direction of the connecting pin 5G when the connecting pin 5G of the revolving frame 5 is to be inserted/removed. Therefore, as shown in FIG. 11, when the connecting pin 5G of the revolving frame 5 is to be inserted/removed, the bolt 23L fastening the upper accommodating case 23 to the case-fixing bracket 17 is removed, and the bolt 23M fastening the upper accommodating case 23 to the lower accommodating case 21 is removed. In this state, the upper accommodating case 23 can be rotated to the position out of the extension in the axial direction of the connecting pin 5G around the shaft 24B of the hinge mechanism 24. As a result, the upper accommodating case 23 can be arranged by extending onto the extension of the axis of the connecting pin 5G, and the article accommodating space in the upper accommodating case 23 can be ensured large.

Furthermore, as shown in FIGS. 9 and 10, assuming that the center of gravity of the upper accommodating case 23 is G, the upper accommodating case 23 is mounted on the case-fixing bracket 17 by using the bolt 23L on the virtual line L-L between the center of gravity G and the left and right hinge mechanisms 24 on a plan view. As described above, the upper accommodating case 23 is mounted on the case-fixing bracket 17 at the position slightly shifted to the front side (hinge mechanism 24 side) from its center of gravity G. As a result, even if vibration or twisting occurs during the operation of the hydraulic excavator 1, the vibration of the upper accommodating case 23 can be suppressed. Moreover, the number of bolts 23L for fixing the upper accommodating case 23 to the case-fixing bracket 17 can be kept to 2 by mounting the upper accommodating case 23 on the case-fixing bracket 17 in the vicinity of its center of gravity G.

It should be noted that, the fuel tank 12 storing the fuel is exemplified as the oil reservoir tank, and the case where the case-fixing bracket 17, the lower accommodating case 21, and the upper accommodating case 23 are arranged on the front side of this fuel tank 12 is exemplified. However, the present invention is not limited to that, and it may be so constituted that the hydraulic oil tank 11 is provided on the front side of the fuel tank 12, and the case-fixing bracket 17, the lower accommodating case 21, and the upper accommodating case 23 are arranged on the front side of this hydraulic oil tank 11.

In addition, in this embodiment, the case where the right leg part 19 of the case-fixing bracket 17 is constituted by two legs, that is, the right front leg 19A and the right rear leg 19B is exemplified. However, the present invention is not limited to that, and the right leg part 19 may be constituted by one or three or more legs, for example. The same applies to the left leg part 18.

Further, in this embodiment, the crawler-type hydraulic excavator 1 is described as an example of the construction machine, but the present invention is not limited to that and may be applied to a wheel-type hydraulic excavator. Other than that, it can be widely applied to other construction machines such as a hydraulic crane and the like.

DESCRIPTION OF REFERENCE NUMERALS

1: Hydraulic excavator (Construction machine)
2: Lower traveling structure
3: Upper revolving structure
4: Working mechanism
5: Revolving frame
5A: Bottom plate
5B: Left vertical plate
5C: Right vertical plate
5G: Connecting pin
6: Engine
11: Hydraulic oil tank (oil reservoir tank)
12: Fuel tank (oil reservoir tank)
14: Reducing agent tank
16: Housing case
17: Case-fixing bracket
18: Left leg part
19: Right leg part
20: Mounting platform
21: Lower accommodating case
21E: Top surface part (top surface)
23: Upper accommodating case
23A: Top surface
23B: Lower surface
23C: Front surface
23D: Rear surface
23E: Left side surface
23F: Right side surface
24: Hinge mechanism
G: Center of gravity
L-L: Virtual line

The invention claimed is:

1. A construction machine comprising:
an automotive lower traveling structure;
an upper revolving structure rotatably mounted on said lower traveling structure; and
a working mechanism tiltably provided on said upper revolving structure, wherein
said upper revolving structure includes:
a revolving frame having a bottom plate and left and right vertical plates provided on said bottom plate and having a connecting pin located on a front side of each of said vertical plates for mounting said working mechanism,
an engine mounted on a rear side of said revolving frame, and
an oil reservoir tank having a front end located on a rear side from said connecting pin of said revolving frame and arranged on an outer side of one vertical plate of said vertical plates, characterized in that:
a housing case is provided in said revolving frame at a position on the front side of said oil reservoir tank,
said housing case is constituted by including a case-fixing bracket mounted on said revolving frame, a lower accommodating case arranged by surrounding said case-fixing bracket and in which a reducing agent tank storing a reducing agent for purifying an exhaust gas from said engine is accommodated, and an upper accommodating case located on an upper side of said lower accommodating case,
said case-fixing bracket is formed by a left leg part, a right leg part, amounting platform provided on each of said leg parts across said reducing agent tank, and
said mounting platform of said case-fixing bracket connects a top surface of said lower accommodating case and a lower surface of said upper accommodating case.

2. The construction machine according to claim 1, wherein
said upper accommodating case is constituted by a box structural body surrounded by a top surface, said lower surface, a front surface, a rear surface, and left and right side surfaces; and
said mounting platform of said case-fixing bracket is set to a size equal to or larger than that of said lower surface of said upper accommodating case.

3. The construction machine according to claim 1, wherein
said upper accommodating case is arranged on an extension of an axis of said connecting pin which is an inserting/removing direction of said connecting pin; and
a hinge mechanism for rotating said upper accommodating case to a position out of the extension of the axis of said connecting pin with respect to said lower accommodating case is provided between said lower accommodating case and said upper accommodating case.

4. The construction machine according to claim 3, wherein
said upper accommodating case is mounted on said case-fixing bracket on a virtual line extending in a left-right direction between a center of gravity of said upper accommodating case and said hinge mechanism on a plan view.

* * * * *